(12) United States Patent
Stokes et al.

(10) Patent No.: US 7,950,409 B2
(45) Date of Patent: May 31, 2011

(54) RUPTURE DISC ASSEMBLY THAT WITHSTANDS MUCH HIGHER BACK PRESSURES THAN ACTUATION PRESSURE

(75) Inventors: Jeffrey A. Stokes, Grain Valley, MO (US); Donald R. Hibler, Jr., Bates City, MO (US); Eddie R. Malcolm, Independence, MO (US)

(73) Assignee: Fike Corporation, Blue Spings, MO (US)

( * ) Notice: Subject to any disclaimer, the term of this patent is extended or adjusted under 35 U.S.C. 154(b) by 272 days.

(21) Appl. No.: 11/668,993

(22) Filed: Jan. 30, 2007

(65) Prior Publication Data

US 2008/0178938 A1 Jul. 31, 2008

(51) Int. Cl.
*F16K 17/16* (2006.01)
*F16K 17/40* (2006.01)
(52) U.S. Cl. ............... 137/68.21; 137/68.12; 137/69
(58) Field of Classification Search ............... 137/68.19, 137/68.21, 68.22, 68.25, 68.28, 68.23, 68.12, 137/68.24, 69; 166/179, 317, 368
See application file for complete search history.

(56) References Cited

U.S. PATENT DOCUMENTS

| | | | | |
|---|---|---|---|---|
| 372,493 A * | 11/1887 | Shaw | ............... | 137/69 |
| 1,248,578 A * | 12/1917 | Vuilleumier | ............... | 137/69 |
| 1,665,391 A * | 4/1928 | Willoughby | ............... | 137/69 |
| 1,930,960 A * | 10/1933 | Raymond | ............... | 220/89.2 |
| 1,987,919 A * | 1/1935 | Wells | ............... | 166/148 |
| 2,128,039 A * | 8/1938 | Cibulka | ............... | 137/69 |
| 2,163,401 A * | 6/1939 | Loudenbeck | ............... | 137/68.23 |
| 2,582,171 A * | 1/1952 | Simpson | ............... | 220/89.2 |
| 3,292,658 A * | 12/1966 | Scaramucci | ............... | 137/856 |
| 3,608,569 A * | 9/1971 | Burns | ............... | 137/69 |
| 3,623,495 A * | 11/1971 | Erb | ............... | 137/69 |
| 4,505,180 A * | 3/1985 | Hinrichs | ............... | 137/68.21 |
| 5,154,202 A * | 10/1992 | Hibler et al. | ............... | 137/68.27 |
| 5,305,828 A | 4/1994 | White et al. | | |
| 5,511,617 A | 4/1996 | Snider et al. | | |
| 5,926,988 A * | 7/1999 | Casull | ............... | 42/25 |
| 5,996,696 A | 12/1999 | Jeffree et al. | | |
| 6,230,733 B1 * | 5/2001 | Strelow et al. | ............... | 137/68.23 |
| 6,431,383 B1 * | 8/2002 | Mozley et al. | ............... | 137/69 |
| 6,591,915 B2 | 7/2003 | Burris et al. | | |
| 6,612,326 B2 * | 9/2003 | Specht et al. | ............... | 137/69 |
| 6,752,212 B2 | 6/2004 | Burris et al. | | |
| 2002/0017319 A1 * | 2/2002 | Hintzman et al. | ............... | 137/68.23 |

* cited by examiner

*Primary Examiner* — John Rivell
(74) *Attorney, Agent, or Firm* — Hovey Williams LLP

(57) ABSTRACT

An activation rupture disc unit is provided that is capable of withstanding a substantially higher back pressure than its burst activation pressure. The unit includes a tubular housing having a fluid passage. Tapered wall structure defines at least a portion of the passage with the fluid outlet thereof being of greater area than the fluid inlet. A rupture disc is carried by the housing and has a central bulged section in fluid-blocking relationship to the passage. A tapered, self-releasing solid plug is positioned in and conforms to the tapered portion of the passage. The plug has a curved surface conforming to and positioned in full supporting relationship to the central section of the rupture disc. The plug is of sufficient mass to prevent rupture of the central section of the disc under a back pressure substantially greater than the activation pressure of the disc.

34 Claims, 4 Drawing Sheets

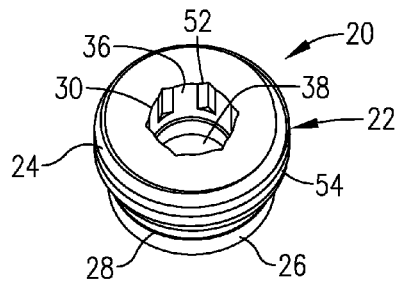
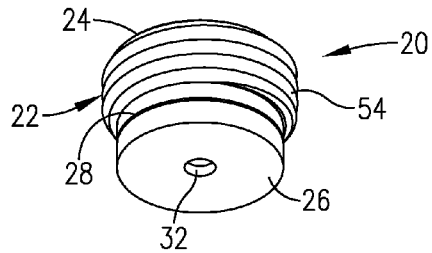
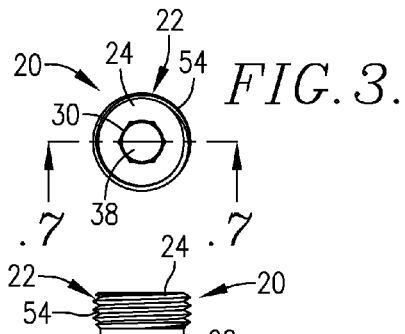
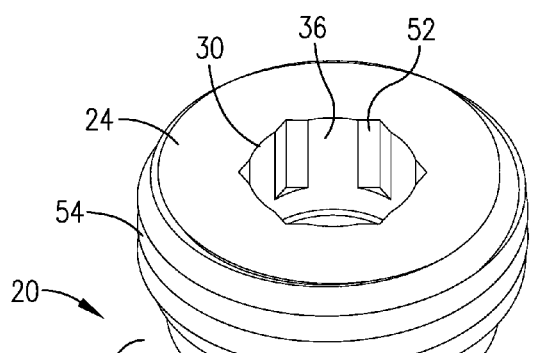
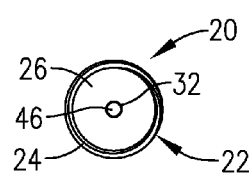
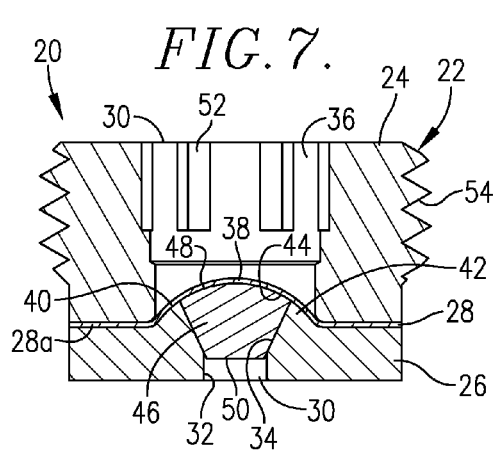
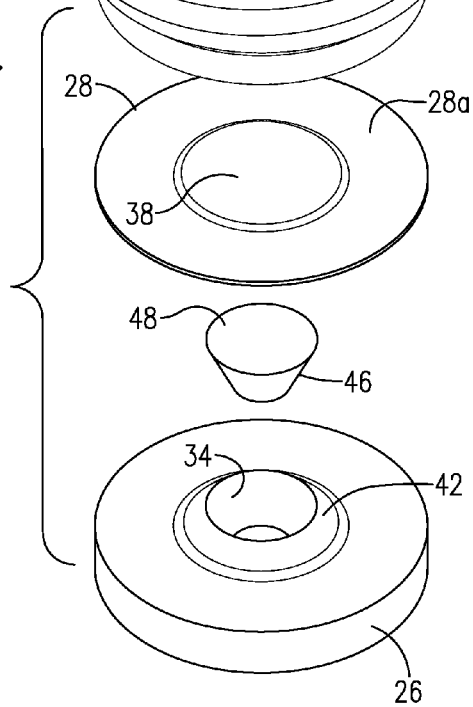

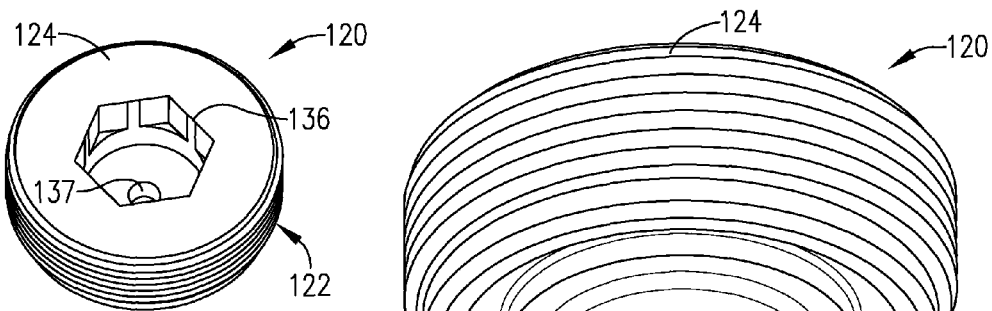
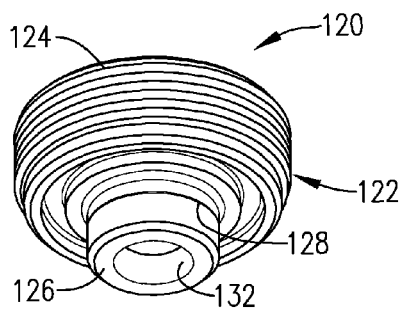
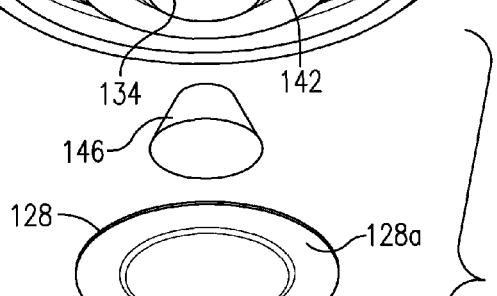
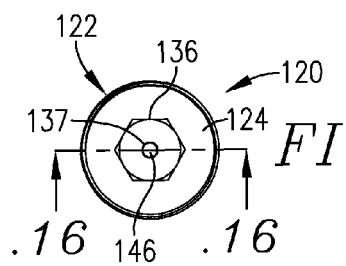
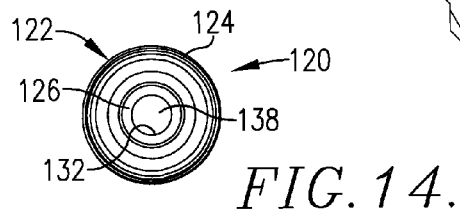
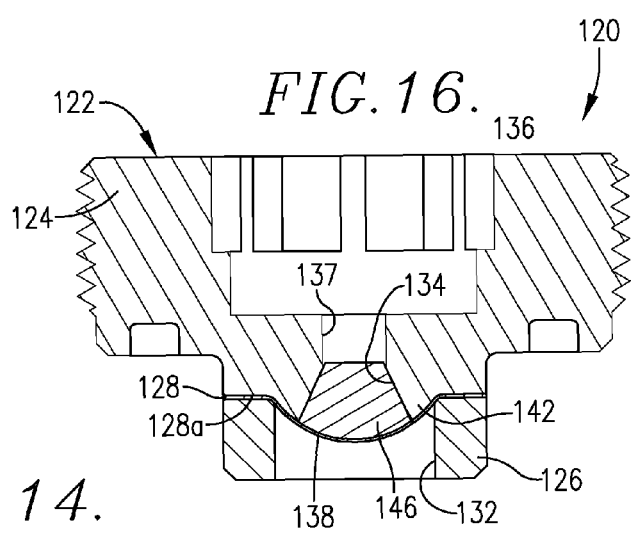

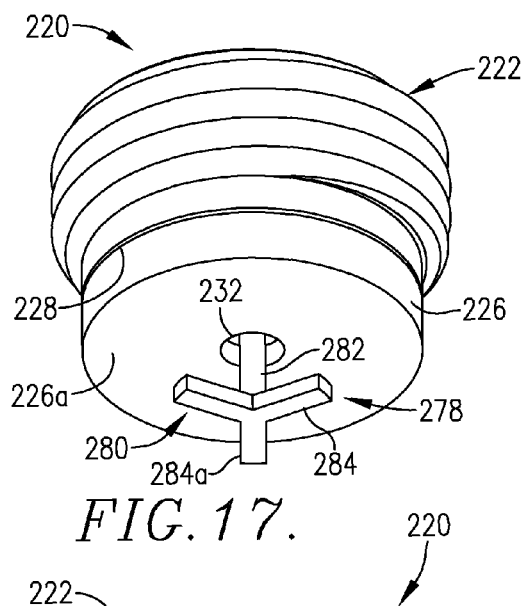
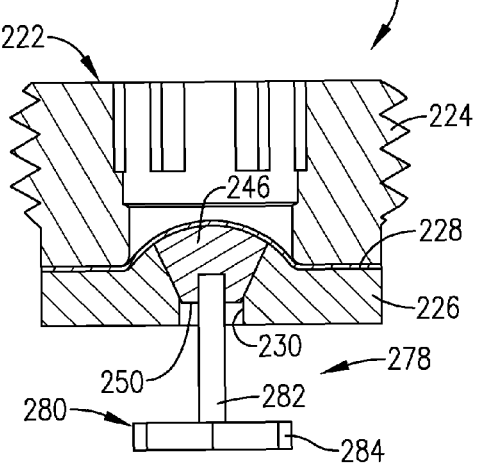
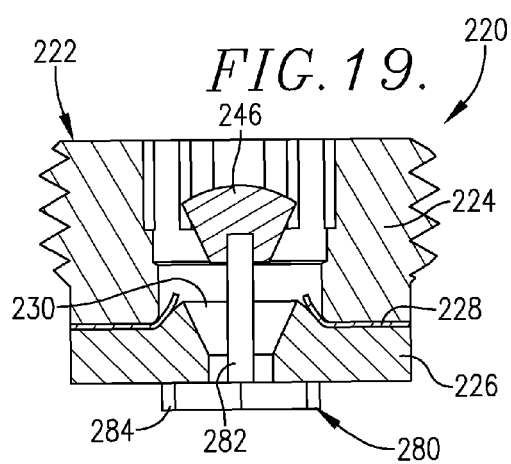
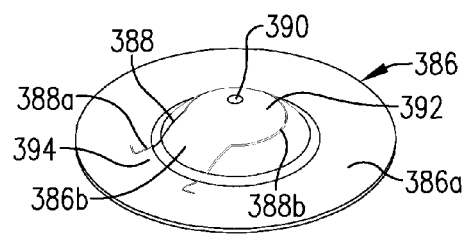
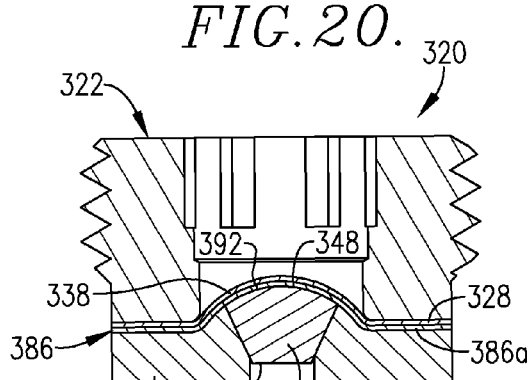
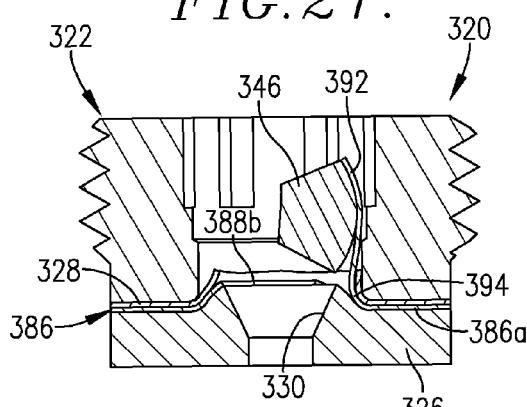
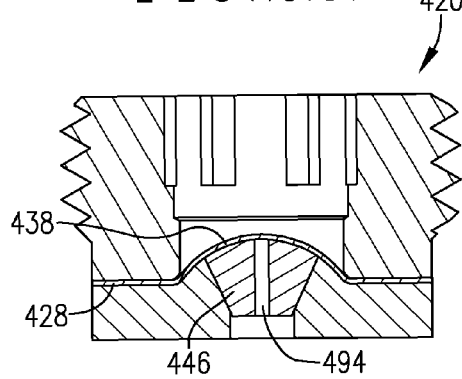

RUPTURE DISC ASSEMBLY THAT WITHSTANDS MUCH HIGHER BACK PRESSURES THAN ACTUATION PRESSURE

BACKGROUND OF THE INVENTION

1. Field of the Invention

This invention relates to an activation rupture disc unit capable of withstanding a substantially higher back pressure than its burst activation pressure. A major problem in oil exploration and recovery is the failure of pressure activation devices. Although the rupture disc unit has particular utility for activating any one of a number of oil field downhole completion and production devices, it can be used for other applications requiring withstand of a high differential back pressure including deep sea, aerospace, transformers, and high pressure vessels.

The activation disc is preferably capable of withstanding at least about 20,000 psig differential back pressure, or higher, e.g., 35,000 psig up to as much as about 50,000 psig, while being rupturable at an activation pressure of the order of 1,000 to 8,000 psig. The burst pressure for a ¼ in. diameter disc will be about 1,000 psig, and lower than that pressure for larger size discs up to 90% of the operating ratio. In addition, the rupture disc of the unit desirably will not unduly fatigue when subjected to at least about 100 cycles of full back pressure to 90% of the burst pressure, and must reliably operate within a temperature range as low as 40° F. to as much as 350° F., that typically may be encountered downhole in an oil well.

2. Description of the Prior Art

Rupture discs have previously been employed in a variety of downhole oil well applications. In U.S. Pat. No. 5,996,696, apparatus is provided for testing the integrity of oil delivery tubing with an oil well casing. A tubular holder connected to the lower of a series of end-to-end pipe string sections is provided with a rupture disc normally closing the through passage in the holder. The pipe string, with the holder in place, is subjected to liquid pressure sufficient to test the integrity of the connection between adjacent pairs of tubing sections. Once it has been determined there are no leaks in any of the pipe string section connections, the tubing string is over pressured to an extent to rupture the disc, thereby opening the holder and providing a through passage communicating with the pipe string. In this well test rupture disc application, the pressure on opposite sides of the rupture disc never exceeds the ability of the disc to withstand the differential back pressure.

In another downhole rupture disc application, a rupture disc is mounted in the sidewall of a tubular holder connected to the lowermost section of a pipe string, immediately above a sucker rod or other type of pump. When maintenance or replacement of the pump is required, which can vary in frequency from weeks to months depending upon downhole conditions, the tubing string can be over pressured from a surface pressure source to an extent to rupture the disc, thereby allowing liquid in the pipe string to drain from the string as the sections are sequentially pulled to the surface and disconnected one at a time. In this manner, spillage of oil from each section as it is withdrawn from the well and disconnected from the pipe section there below is avoided. Here again, the pressure differential on the dump valve disc is not so great as to cause premature rupture of the disc.

There has been a longstanding need in the art, though, for an activation rupture disc unit that is capable of withstanding very high variable differential back pressures, but at the same time may reliably be selectively opened under a significantly lower activation pressure.

SUMMARY OF THE INVENTION

The previously unsolved need was for an activation rupture disc unit that would withstand extremely high differential back pressures as compared with the design activation pressure, and that would reliably withstand at least 100 cycles of full back pressure to 90% of the burst pressure at temperatures ranging from as low as 40° F. to as high as 350° F. The rupture disc unit had to be sealable with an O-ring, be readily installable and replaceable in a support member, be economical to manufacture, and be capable of withstanding the corrosive conditions often encountered in oil field well bores. These challenging problems were met by the present invention.

The rupture disc unit includes a housing having a fluid activation passage and a bulged rupture disc in normal fluid-blocking relationship to the passage. A portion of the fluid passage is tapered in a direction such that the fluid inlet of the tapered portion is of less area than the area of the fluid outlet. A bulged rupture disc is mounted within the housing in disposition with the central section thereof in fluid-blocking relationship to the outlet of the tapered portion of the activation fluid passage. The convex surface of the rupture disc faces in a direction away from the larger end of the tapered fluid activation passage. A tapered, generally conical, self-releasing solid plug is complementally received in the tapered passage with the largest end face thereof in conforming engagement with the concave surface of the bulged section of the rupture disc. The plug is of sufficient mass to support and prevent rupture of the disc under a high differential back pressure applied against the rupture disc in a direction toward the larger face of the plug as the plug wedges in the tapered passage. However, the plug readily releases from the tapered passage when an activation pressure is applied to the plug in a direction toward the concave surface of the rupture disc, thereby allowing rupture of the bulged section of the disc.

In one embodiment of the invention, a component is provided in operable association with the plug for capturing the plug upon dislodgement thereof from the fluid passage under fluid pressure there against. The component may be in the form of a T-shaped device in which the stem portion thereof is attached to the plug while the cross-piece of the device is located outboard of the fluid passage. The stem portion of the device is of a length such that the plug may substantially be displaced from the fluid passage before the cross-piece of the device contacts and is restrained by the tubular housing of the activation unit. Another form of capture device may comprise a secondary disc interposed between the plug and the main rupture disc, with the secondary disc having a U-shaped line of weakness presenting a hinge section that is attached as by welding or the like to the plug. Upon fluid pressure dislodgement of the plug from the fluid passage, the plug is captured and maintained within the housing as the U-shaped hinge section connected to the plug is bent away from the main body of the secondary disc.

The diameter of the bulged area of the rupture disc is variable, but normally is within the range of about ⅛ in. to about 4 in., although larger sizes may be employed for specific high pressure withstand applications. The conical plug, having a hemispherical end face, is of a size and mass to support the central section of the rupture disc under a pressure of at least about ten times higher than the activation pressure of the rupture disc. The ratio of the activation pressure to the differential withstand pressure of the unit is preferably from about 1:10 to about 1:50, although the unit may be used in applications where the ratio of activation pressure to the differential withstand pressure is of the order of 1:2. The ratio of the maximum height of the bulged section of the rupture disc to the diameter of the bulged section is about 1:2.5. The ratio of the maximum diameter of the plug to the maximum axial length thereof is approximately 0.7. Although a variety of materials may be used for fabrication of the activation rupture disc unit, the unit housing and plug are preferably constructed from stainless steel bar stock and the rupture disc from Inconel.

BRIEF DESCRIPTION OF THE DRAWINGS

FIG. 1 is a perspective view of one side of one embodiment of the activation rupture disc unit of this invention;

FIG. 2 is a perspective view of the opposite side of the activation rupture disc unit illustrated in FIG. 1;

FIG. 3 is a top view of the activation rupture disc unit of FIG. 1;

FIG. 4 is a plan view of the activation rupture disc unit of FIG. 1;

FIG. 5 is a bottom view of the activation rupture disc unit of FIG. 1;

FIG. 6 is an enlarged exploded perspective view of the rupture disc unit of FIG. 1;

FIG. 7 is an enlarged vertical cross-sectional view of the rupture disc unit of FIG. 1 and taken on line 7-7 of FIG. 3;

FIG. 10 is a perspective view of one side of another embodiment of the activation rupture disc unit of this invention;

FIG. 11 is a perspective view of the opposite side of the activation rupture disc unit illustrated in FIG. 10;

FIG. 12 is a top view of the activation rupture disc unit of FIG. 10;

FIG. 13 is a plan view of the activation rupture disc unit of FIG. 10;

FIG. 14 is a bottom view of the activation rupture disc unit of FIG. 10;

FIG. 15 is an enlarged exploded perspective view of the rupture disc unit of FIG. 10;

FIG. 16 is an enlarged vertical cross-sectional view of the rupture disc unit of FIG. 10 and taken on line 16-16 of FIG. 12;

FIG. 17 is a perspective view of one side of an alternate embodiment of the activation rupture disc unit that includes a component that is operable to capture and hold the plug within the housing upon dislodgment thereof from the fluid passage of the housing;

FIG. 18 is a vertical cross-sectional view of the activation rupture disc unit of FIG. 17;

FIG. 19 is a vertical cross-sectional view similar to FIG. 17, and showing the manner in which the capture component prevents the plug from being discharged from the unit housing upon activation of the unit;

FIG. 20 is a perspective view of a secondary disc that may be incorporated in the housing of the activation rupture disc unit to capture and prevent the plug from being discharged from the unit housing;

FIG. 21 is a vertical cross-sectional view of the alternate embodiment of the activation rupture disc unit incorporating the secondary plug capture disc that prevents the plug from being discharged from the housing;

FIG. 22 is a vertical cross-sectional view of the embodiment of FIG. 21, illustrating the manner in which the plug is captured and prevented from being discharged from the housing upon activation of the unit; and FIG. 23 is a vertical cross-sectional view similar to FIG. 7, illustrating another embodiment of the invention in which the plug supporting the central section of the rupture disc may be provided with a small, axially-extending, fluid passage therethrough.

DETAILED DESCRIPTION OF THE PREFERRED EMBODIMENT

Figure 9:
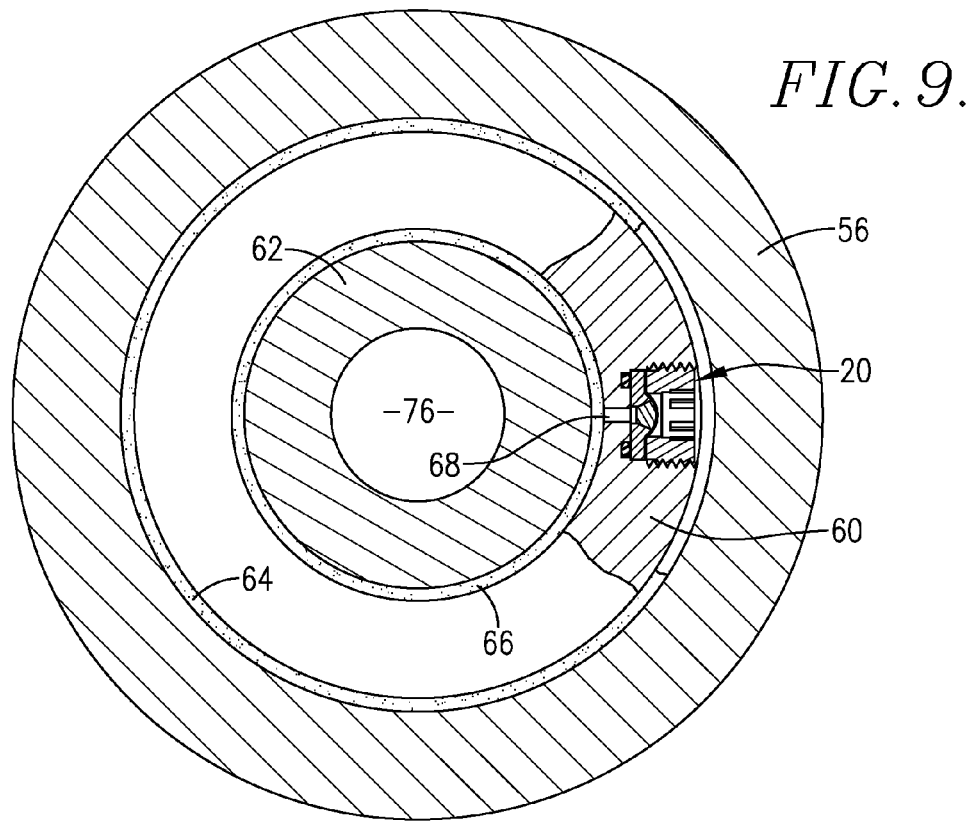
FIG. 9 is a schematic horizontal cross-sectional view through the apparatus of FIG. 8 with parts being broken away for clarity.

The activation rupture disc unit of the embodiment of this invention illustrated in FIGS. 1-6, is broadly designated by the numeral 20. Rupture disc unit 20 is provided with a tubular housing 22 preferably machined from stainless steel bar stock. Housing 22 has an annular stainless steel inlet body 24 and a separate annular stainless steel outlet member 26. A bulged rupture disc 28 of Inconel has a flat peripheral portion 28a positioned between body 24 and member 26, as best illustrated in FIG. 7. Other materials that may be used for fabrication of rupture disc 28 include stainless steel, Hasteloy, and aluminum, among others. The outer margins of body 24 and member 26, as well as the outer edge of peripheral portion 28a of bulged rupture disc 28 are preferably joined as by welding or the like to form a unitary assembly.

Member 26 has a central fluid activation passage 30 that includes an outermost cylindrical segment 32 that is coaxial and communicates with a tapered, preferably conical, passage portion 34 of passage 30. The portion 34 is of greater length axially thereof than cylindrical segment 32. It is preferred that the angularity of tapered portion 34 of activation passage 30 be within the range of about 16° to about 35°.

The fluid discharge passage portion 36 of passage 30, extending through annular inlet body 24 is coaxial with passage 30 and of substantially greater diameter than the passage portion 34 of activation passage 30. The diameter of passage portion 36 is preferably the same as the diameter of the bulged section 38 of rupture disc 28. Outer surface 40 of the inwardly-extending, unitary, annular lip portion 42 of outlet member 26 is curved to complementally engage the inner concave face 44 of bulged section 38 of rupture disc 28.

A tapered, generally conical, self-releasing, solid monolithic plug 46 is positioned in tapered passage 34 in complemental engagement therewith. Plug 46 is preferably of an axial length generally equal to the axial length of tapered portion 34 of activation passage 30. The hemispherical end face segment 48 of plug 46 is configured to complementally engage and support the inner concave face 44 of bulged section 38 of rupture disc 28. The outer circular edge of lip portion 42 of annular outlet member 26 should be configured to merge smoothly with the circumferentially-extending edge of hemispherical end face segment 48 of plug 46. A tangent line to the outer curved surface of plug 46 is preferably at an angle of 25° with respect to an imaginary line parallel with the axis of the conical plug, and extending through the edge where the end face segment 48 merges with the curvilinear surface of the plug. A "self-releasing plug" as used herein means that if the taper of the plug and the associated passage therefore is unduly narrow, the plug 46 will tend to wedge in the tapered passage. On the other hand, if the taper angle is too large, the plug 46 will tend to shift and not be properly held in place under high pressure loads. The face 50 of plug 46 is preferably flat, and located in alignment with the zone of juncture of cylindrical segment 32 of passage 30 with the tapered portion 34. Plug 46 is also preferably fabricated of stainless steel.

The passage portion 36 in annular inlet body 24 is of cross-sectional hex-shaped configuration for receipt of a hex installation and removal tool and is provided with six axially-extending, inwardly-directed, spaced, cross-sectionally V-shaped cavities 52 for accommodating the tool. Annular inlet body 24 has external threads 54 for holding the rupture disc unit 20 in a fixed position in structure in which the unit 20 is threadably mounted.

For most applications of activation rupture disc unit 20, the tubular housing made up of annular inlet body 24 and annular outlet member 26 is sized to accommodate rupture discs having a bulged section 38 that are of diameters ranging from about ⅛ in. to about 4 in. It has been found that by providing a stainless steel plug 46 wherein the ratio of the maximum diameter of the plug to the maximum axial length thereof is about 0.7, the plug 46 is of sufficient mass to support and prevent rupture of the central bulged section 38 of rupture disc 28 under a differential back pressure at least about ten times greater than the activation pressure of the bulged section 38 of rupture disc 28. The taper of passage portion 34, and the corresponding taper of the curved surface of conical plug 46, is preferably within the range of 16° to 35°, and most preferably about 25°. By maintaining the taper angle within that range, the plug 46 is self-releasing at a most desirable activation pressure within the range of from about 1,000 psig to 8,000 psig, and most usually in the range of 5,000 to 6,000 psig. Although stainless steel is a preferred material for construction of housing 20 and plug 46, other equivalent metal materials may be used, depending upon the differential back pressure that must be withstood during use of the activation rupture disc unit 20. Alternate materials for the housing include metals such as Inconel, Hasteloy, and aluminum, while the plug 46 may, in addition, be fabricated of ceramic compositions, reinforced synthetic resin materials such as epoxies, graphites or other similar frangible materials, glass fiber reinforced carbonaceous products, or low-melting eutectic or fusible alloys that melt, for example, at a temperature within the range of about 300° F. to 350° F.

An exemplary plug 46 intended for with a rupture disc having a ¼ in. bulged section 38, may, for example, be fabricated from 316 stainless steel bar rod that is ¼ in. in diameter and ⅜ in. long. The curved surface 48 of this plug typically will have a radius of 0.154 in. The overall maximum diameter of plug 46 measured at the circumferential edge of end face segment 48 will be 0.178 in. The overall height of the plug will be 0.125 in. The preferred taper of conical plug 46 will be 25°; thus, the area of face 50 is a function of the angularity of the tapered surface of the plug.

Figure 8:
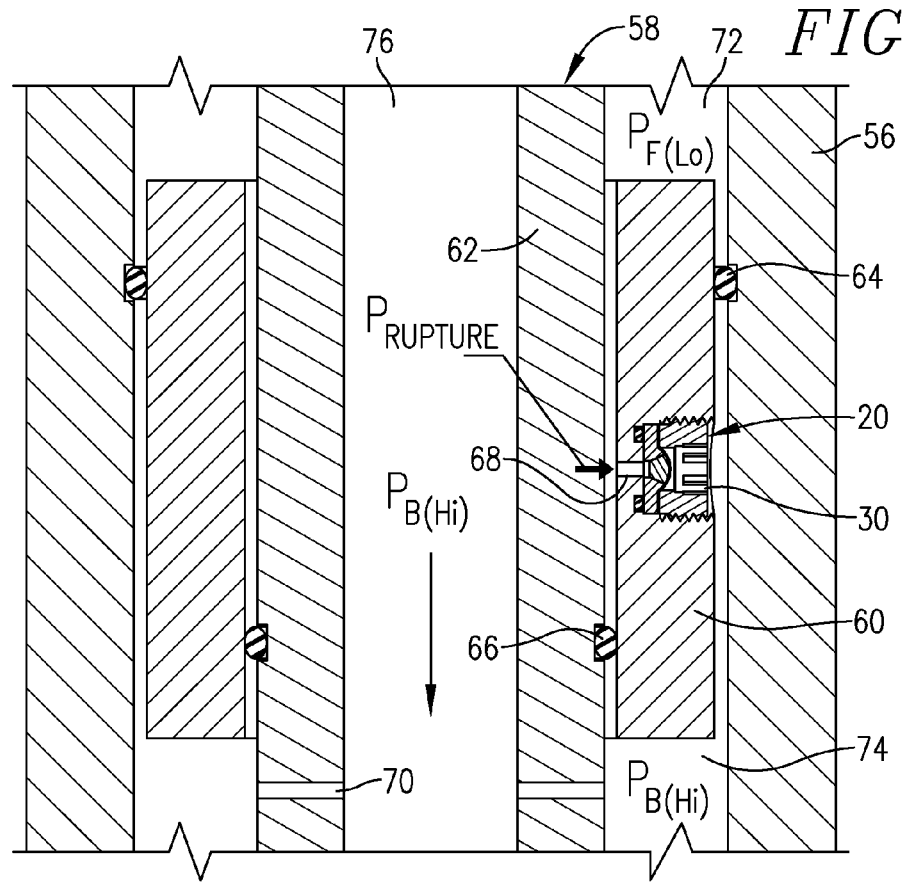
FIG. 8 is a schematic vertical cross-sectional view through apparatus that may be used downhole in an oil well, for example, illustrating the activation rupture disc unit of FIG. 1 mounted in operative position in a piston sleeve of the apparatus.

FIGS. 8 and 9 schematically illustrate one useful application of activation rupture disc unit 20 in the oil completion and production field. In the schematic depictions of these figures, the outer tube 56 of a downhole oil well tool 58, receives shiftable sleeve piston 60 located between tube 56 and inner tube 62. An O-ring 64 provides a seal between the outer face of piston 60 and the inner face of tube 56, while an O-ring 66 provides a seal between the inner face of piston 60 and the outer face of tube 62. An activation rupture disc unit 20 is threaded into the outer face of piston 60, with the passage portion 36 in communication with the space between the outer face of piston 60 and the inner face of tube 56 below O-ring seal 64. The cylindrical segment 32 of passage 30 communicates with a port 68 in piston 60 that opens into the space between the inner face of piston 60 and the outer face of tube 62 above O-ring 66. A plurality of radially disposed passages 70 communicate chamber 74 with chamber 76. O-rings 64 and 66 cooperate to define a chamber 72 on one side thereof and a chamber 74 on the opposite side thereof. The interior of tube 62 presents an elongated chamber 76. In the schematic drawing of FIG. 8, chamber 72 has the designation $P_{F(LO)}$ while the designation $P_{B(HI)}$ is in chambers 74 and 76. These designations are representative of pressure conditions existing in respective chambers during operation of tool 58.

In an exemplary use of tool 58, the chamber 72 may be pressurized with gas such as nitrogen at ground level to a predetermined pressure, for example, 3,500 psig. Pressurization of chamber 72 produces a pressure differential between chamber 72 and chamber 74, causing the sleeve piston 60 to be shifted to the end of its path of travel toward chamber 74. Chamber 72 is then preferably capped to close off that chamber. The tool 58 may then be lowered into the well bore hole. The hydrostatic pressure in chambers 74 and 76 increases with depth. As the tool is lowered, the pressure $P_{B(HI)}$ in chambers and 76 and 74 increases until that pressure equalizes with the pressure in chamber 72. Increase of pressure in chambers 74 and 76 above the initial pressure in chamber 72, can move the sleeve piston 60 as the gas in chamber 72 is further compressed. The pressure in chamber 72 gradually increases until it equalizes with the pressure in chambers 74 and 76. In one type of tool, the sleeve piston 60 may ultimately be locked in position, when the equalized pressure in chamber 72 and chambers 74, 76 reaches a certain level of, for example, 10,000 psig.

The pressure in chamber 76, and thereby in chamber 74, can fluctuate dramatically as a result of well fluctuations between, for example, approximately 6,000 psig and 20,000 psig. When the pressure in chambers 74 and 76 increases above the pressure in chamber 72, plug 46 and the lip portion 42 of annular outlet member 26 fully support the bulged section 38 of rupture disc 28, preventing rupture of the disc. That differential pressure increase can be as much as 20,000 psig (30,000 psig in chambers 74 and 76 minus 10,000 psig in chamber 72). Plug 46 and the associated lip 42 supporting bulged section 38 of rupture disc 28 are capable of fully supporting that very high back pressure.

On the other hand, when the pressure in chambers 76 and 74 falls below 10,000 psig, pressure cycling of the bulged section 38 of rupture disc 28 may occur because sleeve piston 60 is locked in position and not able to further pressurize the gas trapped in chamber 72. Each change in pressure in chamber 74 below the offsetting pressure in chamber 72 is one cycle of rupture disc 28. The unique construction of rupture disc unit 20 accommodates pressure cycling of the rupture disc of at least about 100 cycles or more.

The rupture disc 28 may be activated and ruptured upon demand by simply increasing the pressure in chamber 72 to a level above the rupture pressure of the disc, which, for example, may be 5,000 psig above the pressure level in chambers 74 and 76. When pressure is applied against the face 50 of plug 46 that is sufficient to effect rupture of disc 28, the plug 46 shifts without restraint toward the bulged section 38 of rupture disc 28, thereby effecting rupture and opening of the bulged section 38.

The alternate activation rupture disc unit 120 shown in FIGS. 10-16 of the drawings is similar in construction and operation to rupture disc unit 20 and has all of its operational characteristics and advantages. Rupture disc unit 120 includes housing 122 provided with an annular, externally-threaded inlet body 124 and an annular outlet member 126. A rupture disc 128 having a bulged central section 138 and a peripheral flange 128a is interposed between body 124 and member 126 in the same manner as previously described with respect to rupture disc unit 20.

The principal difference between disc unit 20 and disc unit 120 is reversal of the direction of opening of disc 128. Rupture disc unit 120 is also provided with a tubular housing 122, preferably machined from stainless steel bar stock. Housing 122 has an annular stainless steel inlet body 124 and a separate annular stainless steel outlet member 126. The bulged rupture disc 128 is interposed between inlet body 124 and outlet member 126, with body 124, member 126, and the peripheral portion 128a of disc 128 being joined by welding or the like.

Housing 122 has a central activation passage 130 made up of passage portion 136 that is of the same diameter and configuration as the hex tool receiving passage portion 36 of rupture disc unit 20. Passage portion 136 communicates with a smaller diameter passage portion 137 that leads to a tapered passage portion 134. The circumferentially-extending, outwardly-directed lip portion 142 of body 124 is of curved configuration to complementally engage the outer perimeter of the concave face 144 of rupture disc 128, similar to lip portion 42 of inlet body 24 of rupture disc unit 20. The tapered passage portion 134 also preferably is an angle of from 16° to 35°, and most preferably is about 25°.

Annular outlet member 126 has a passage 132 coaxial with activation passage 130 of annular inlet body 124. The diameter of passage 132 is preferably equal to the diameter of the bulged section 138 of rupture disc 128. Self-releasing conical plug 146, also preferably constructed of 316 stainless steel, is configured to be complementally received in the tapered passage portion 134 of inlet body 124. The dimensions of plug 146 may be the same as described with respect to plug 46, when rupture disc unit 120 is to be used in conjunction with a rupture disc having a ¼ in. diameter bulged section 138.

Rupture disc unit 120 is also adapted to be used in applications where the ability of the unit to withstand a very high back pressure as compared with the actuation pressure is a requisite. Actuation of the unit 120 is controlled by introduction of pressurized fluid into passage 130 through passage portion 136 and passage portion 137 against the face 150 of plug 146 that is sufficient to rupture bulged section 138 of rupture disc 128. Because of the self-releasing property of plug 146, it is not restrained against release from tapered passage portion 134.

Rupture disc unit 120 is especially useful as an activation device where the outlet side of the rupture disc unit is exposed to direct well pressure without requiring that pressure be applied to the inlet side of the unit to maintain a low pressure differential. For example, the outlet could be exposed to well pressures while the inlet is at atmospheric pressure.

Another alternate activation rupture disc unit 220 is illustrated in FIGS. 17-19 of the drawings and includes a similar housing, disc, and plug as shown and described with respect to FIGS. 1-7, with the exception of the addition of a component broadly designated 278 comprising a generally T-shaped metal device 280 having an elongated stem portion 282 extending through passage 232 of housing 222 and that may be recessed in and welded to plug 246. The stem portion 282 of device 280 is of a length such that the branched cross-piece 284 of device 280 is normally spaced from the outer surface 226a of outlet member 226 of housing 220. The arms 284a of cross-piece 284 extend away from passage 232 in different directions, as shown in FIG. 17. Upon activation of the unit 220, as shown in FIG. 19, by fluid pressure against the face 250 of plug 246, the disc 228 ruptures as the plug 246 is dislodged from passage 230. Plug 246 is captured within housing 222 by engagement of the arms 284a of cross-piece 284 with the outer surface 226a of outlet member 226.

Alternate construction for capturing the plug upon activation of the rupture disc unit is shown in FIGS. 20-22. A disc 328 of unit 320 overlies a secondary disc 386. Disc 386 has a flange portion 386a that is unitary with the central bulged section 386b. Disc 386 is provided with a U-shaped slit or line of weakness 388 having leg segments 388a that extend into flange 386a and merge with a generally circular internal section 388b formed in the bulged section 386b of disc 386. The line of weakness 388 defines a hinge section 392 that is capable of bending about the hinge area 394 of disc 386 between the outermost extremities of leg segments 388a of line of weakness 388. The domed central section 386b is spot-welded at point 390 to the end-face segment 348 of plug 346.

As best shown in FIG. 22, upon actuation of unit 320 by fluid pressure against the face 350 of plug 346 causing the plug to be dislodged from outlet member 326, the central bulged section 338 of disc 328 is ruptured by the plug 346. Dislodgement of plug 346 from the passage 330 of outlet member 326 causes the hinge section 392 of disc 386 to bend about the hinge area 394. By virtue of the spot-weld of hinge section 392 of disc 386 to the face 348 of plug 346, actuation of the plug 346 results in the plug 346 being retained within housing 322 of unit 320, as best shown in FIG. 22.

In a further alternate embodiment of the invention as shown in FIG. 23, the unit 420 is identical to unit 20 except that the plug 446 thereof is provided with an axially-extending fluid passage 494 therethrough. The passage 494 allows activation fluid pressure to impinge on the underface of the bulged section 438 of rupture disc 428 to assist in controlled rupture of disc 428. By provision of passage 494 through plug 446, fluid activation of rupture disc unit 420 can be more accurately controlled under certain operating conditions. For example, where the activation fluid is of relatively high viscosity, provision of a passage 494 in plug 446 will allow the high viscosity material to directly contact the rupture disc 428 and thereby assist in rupture thereof. The diameter of passage 494 is preferably proportional to the ratio of the back pressure to the activation pressure. The higher the ratio, the smaller the passage diameter; the lower the ratio, the greater the diameter of passage 494 with respect to the diameter of plug 446. At lower ratios, where quicker activation of the rupture disc 428 is desired, the passage 494 should be of greater diameter. At higher ratios, where greater control over activation of the rupture disc is required or desired, a passage 494 of lesser diameter should be provided with respect to the diameter of plug 446.

We claim:

1. An activation rupture disc unit capable of withstanding a substantially higher back pressure than its burst activation pressure, said unit comprising:

a tubular housing having a fluid activation passage, said housing being provided with wall structure defining at least a portion of the fluid activation passage, said portion of the passage having a fluid inlet and a fluid outlet, said wall structure being tapered in a direction such that the fluid inlet of said portion of the activation passage is of less area than the area of the fluid outlet;

a rupture disc mounted within the housing in disposition with a central section thereof in fluid-blocking relationship to said outlet of the tapered portion of the activation fluid passage; and a tapered, self-releasing plug positioned in said tapered portion of the fluid activation passage in supporting relationship to the central section of the rupture disc, said plug having surfaces conforming to and engaging the taper of said wall structure and the central section of the disc, respectively, while the rupture disc central section is in fluid blocking relationship to the fluid activation passage, said plug being of sufficient mass to support and prevent rupture of the disc under a back pressure acting upon the disc that is substantially greater than the activation pressure of the disc, said rupture disc having a central bulged section extending across the outlet of the tapered portion of the activation passage, said bulged section having opposed concave and convex surfaces, said plug being provided with a hemispherical end face generally conforming to and engaging the proximal concave surface of the rupture disc.

2. An activation rupture disc unit as set forth in claim 1, wherein said plug is a solid monolithic body.

3. An activation rupture disc unit as set forth in claim 1, wherein said plug has an axially-extending passage therethrough of a diameter that is proportional to the ratio of the back pressure to the activation pressure.

4. An activation rupture disc unit as set forth in claim 1, wherein said plug is of generally conical configuration.

5. An activation rupture disc unit as set forth in claim 1, wherein the ratio of the maximum diameter of said plug to the maximum axial length thereof is approximately 0.7.

6. An activation rupture disc unit as set forth in claim 1, wherein the diameter of said bulged section of the disc is within the range of about ⅛ in. to about 4 in.

7. An activation rupture disc unit as set forth in claim 1, wherein said plug is of a size and mass to support the central section of the rupture disc under a back pressure at least about ten times greater than the activation pressure of the rupture disc.

8. An activation rupture disc unit as set forth in claim 1, wherein said plug is of a size and mass to support a back pressure of at least about 50,000 psig.

9. An activation rupture disc unit as set forth in claim 1, wherein said plug is of a size and mass to support a back pressure of at least about 35,000 psig.

10. An activation rupture disc unit as set forth in claim 8, wherein said central section of the rupture disc will rupture under an activation pressure of from about 1,000 to about 8,000 psig.

11. An activation rupture disc unit as set forth in claim 8, wherein said central section of the rupture disc will rupture under an activation pressure of from about 5,000 to about 6,000 psig.

12. An activation rupture disc unit as set forth in claim 1, wherein the ratio of the activation pressure to withstand pressure of the unit is from about 1:2 to about 1:50 psig.

13. An activation rupture disc unit as set forth in claim 12, wherein the ratio of the activation pressure to withstand pressure of the unit is from about 1:10 to about 1:50 psig.

14. An activation rupture disc unit as set forth in claim 1, wherein said housing is provided with external threads for adapting the unit to be inserted in a threaded opening therefore of an oil well completion tool.

15. An activation rupture disc unit as set forth in claim 1, wherein said housing includes a cylindrical body and a cylindrical inlet ring, the rupture disc being provided with a peripheral flange clamped between the body and the inlet ring.

16. An activation rupture disc unit as set forth in claim 1, wherein the wall structure defining the activation passage is tapered at an angle of from about 16° to about 35°.

17. An activation rupture disc unit as set forth in claim 1, wherein the wall structure defining the activation passage is tapered at an angle of about 25 °.

18. An activation rupture disc unit as set forth in claim 1, wherein said plug is of metal material.

19. An activation rupture disc unit as set forth in claim 1, wherein said plug is of ceramic material.

20. An activation rupture disc unit as set forth in claim 1, wherein said plug is of reinforced synthetic resin material.

21. An activation rupture disc unit as set forth in claim 1, wherein said plug is of graphite material.

22. An activation rupture disc unit as set forth in claim 1, wherein said plug is of a frangible material.

23. An activation rupture disc unit as set forth in claim 1, wherein said plug is of a low-melting fusible material.

24. An activation rupture disc unit as set forth in claim 1, wherein said housing and the rupture disc are of different metals.

25. An activation rupture disc unit as set forth in claim 1, wherein said wall structure includes a generally cylindrical segment defining said fluid activation outlet and that is inboard of said tapered portion of the activation passage, said bulged section being located between the tapered portion and the cylindrical segment of the fluid activation passage at the zone of juncture thereof.

26. An activation rupture disc unit as set forth in claim 1, wherein said wall structure includes a generally cylindrical segment defining said fluid activation outlet and that is outboard of said tapered portion of the activation passage, said bulged section being located between the tapered portion and the cylindrical segment of the fluid activation passage at the zone of juncture thereof.

27. An activation rupture disc unit as set forth in claim 1, wherein said rupture disc is capable of withstanding 100 cycles of a full withstand back pressure up to about 90% of the burst pressure.

28. An activation rupture disc unit as set forth in claim 1, wherein said rupture disc is capable of operating at a selected burst pressure at a temperature within the range of about 40° F. to about 350° F.

29. An activation rupture disc unit as set forth in claim 1, wherein the ratio of the maximum height of the bulged section of the rupture disc to the diameter of the bulged section is about 1:2.5.

30. A rupture disc unit capable of withstanding a high back pressure and comprising:

a tubular housing having a fluid passage,
said housing being provided with a tapered wall structure defining a tapered portion of the fluid passage, said tapered portion of the passage having a fluid inlet and a fluid outlet,
said wall structure being tapered in a direction such that the fluid inlet of said tapered portion of the fluid passage is of less area than the area of the fluid outlet of said tapered portion of the fluid passage;
a rupture disc carried by the housing and having a central bulged section in fluid-blocking relationship to said fluid passage, said bulged section having opposed concave and convex surfaces; and
a tapered, self-releasing plug in said fluid passage in supporting relationship to the rupture disc, said plug conforming to and engaging the taper of said wall structure while the rupture disc central section is in fluid blocking relationship to the fluid passage, said plug having a first hemispherical surface generally conforming to and engaging the proximal concave surface of the central bulged section of the disc in supporting relationship thereto and an opposed second surface having a surface area less than that of said first surface, said rupture disc being located adjacent and in covering relationship to the fluid outlet of said tapered portion.

31. A rupture disc unit capable of withstanding a high back pressure and comprising:

a tubular housing having a fluid passage, said housing being provided with wall structure defining at least a portion of the fluid passage, said portion of the passage having a fluid inlet and a fluid outlet, said wall structure being tapered in a direction such that the fluid inlet of said portion of the fluid passage is of less area than the area of the fluid outlet;

a rupture disc carried by the housing and having a central section in fluid-blocking relationship to said fluid passage;

a tapered, self-releasing plug in said fluid passage in supporting relationship to the rupture disc, said plug conforming to and engaging the taper of said wall structure while the rupture disc central section is in fluid blocking relationship to the fluid passage and having a surface conforming to the central section of the disc in supporting relationship thereto; and a component operably associated with the plug for capturing the plug upon dislodgement thereof from the fluid passage under fluid pressure there against, said component including a hinge device operably connected to the plug for preventing the plug from becoming disconnected from the housing upon dislodgement of the plug from the fluid passage under fluid pressure thereagainst, said hinge device being interposed between the plug and the rupture disc and provided with a central hinge section affixed to the plug, said hinge section opening upon dislodgement of the plug from its position blocking the fluid passage and capturing the plug.

32. A rupture disc unit as set forth in claim 31, wherein said component is secured to the plug.

33. A rupture disc unit as set forth in claim 31, wherein said hinge device has a generally U-shaped slit or line of weakness defining said central hinge section thereof.

34. An activation rupture disc unit capable of withstanding a substantially higher back pressure than its burst activation pressure, said unit comprising:

a tubular housing having a fluid activation passage, said housing being provided with wall structure defining at least a portion of the fluid activation passage, said portion of the passage having a fluid inlet and a fluid outlet, said wall structure being tapered in a direction such that the fluid inlet of said portion of the activation passage is of less area than the area of the fluid outlet;

a rupture disc mounted within the housing in disposition with a central section thereof in fluid-blocking relationship to said outlet of the tapered portion of the activation fluid passage; and a tapered, self-releasing plug positioned in said tapered portion of the fluid activation passage in supporting relationship to the central section of the rupture disc, said plug having surfaces conforming to and engaging the taper of said wall structure and the central section of the disc, respectively, while the rupture disc central section is in fluid blocking relationship to the fluid activation passage, said plug being of sufficient mass to support and prevent rupture of the disc under a back pressure acting upon the disc that is substantially greater than the activation pressure of the disc, said plug having an axially-extending passage therethrough of a diameter that is proportional to the ratio of the back pressure to the activation pressure.

\* \* \* \* \*